(12) United States Patent
Yamashita (10) Patent No.: US 9,266,675 B2
(45) Date of Patent: Feb. 23, 2016

(54) AUTOMATED THREE DIMENSIONAL WAREHOUSE

(71) Applicant: Shin Yamashita, Obertshausen (DE)

(72) Inventor: Shin Yamashita, Obertshausen (DE)

(73) Assignee: Dematic Systems GmbH, Heusenstamm (DE)

( * ) Notice: Subject to any disclaimer, the term of this patent is extended or adjusted under 35 U.S.C. 154(b) by 0 days.

(21) Appl. No.: 14/244,362

(22) Filed: Apr. 3, 2014

(65) Prior Publication Data

US 2014/0212257 A1    Jul. 31, 2014

Related U.S. Application Data

(62) Division of application No. 12/446,541, filed as application No. PCT/JP2008/065892 on Sep. 3, 2008, now abandoned.

(51) Int. Cl.
*B65G 1/04* (2006.01)

(52) U.S. Cl.
CPC .................. *B65G 1/0492* (2013.01)

(58) Field of Classification Search
CPC .......... B65G 1/0414; B65G 1/00; B65G 1/04; B65G 1/0407; B65G 1/0435
USPC .................... 414/267, 277, 280, 331.04, 285; 700/215
See application file for complete search history.

(56) References Cited

U.S. PATENT DOCUMENTS

| | | | |
|---|---|---|---|
| 4,909,697 A | 3/1990 | Bernard, II et al. | |
| 5,135,344 A | 8/1992 | Kita et al. | |
| 5,379,229 A | 1/1995 | Parsons et al. | |
| 5,380,139 A * | 1/1995 | Pohjonen et al. | 414/280 |

(Continued)

FOREIGN PATENT DOCUMENTS

| | | |
|---|---|---|
| EP | 1422169 B1 | 3/2006 |
| EP | 1254852 B1 | 7/2008 |

(Continued)

OTHER PUBLICATIONS

European Search Report from corresponding European Divisional Patent Application No. 12182225.8, dated Sep. 18, 2012.

(Continued)

*Primary Examiner* — Ernesto Suarez
*Assistant Examiner* — Emery Hassan
(74) *Attorney, Agent, or Firm* — Gardner, Linn, Burkhart & Flory, LLP (57) ABSTRACT

An automated warehouse includes first and second stacked racks parallel to each other; first and second shipping-and-receiving stations placed at the same end of the stacked racks; transfer shuttles located between the stacked racks and between the shipping-and-receiving stations; elevator mechanisms equipped with first and second elevator platforms for receiving or transferring the packages to stand-by conveyors; and means for transferring the packages to and from the first and the second elevator platforms. The direction of motion of the stand-by conveyor of the first shipping-and-receiving station and the direction of the motion of the stand-by conveyor of the second shipping-and-receiving station, on the same level of stack, may be opposite; and the direction of motion of some of the stand-by conveyors pertaining to the first shipping-and-receiving station may be opposite to that of the rest of the stand-by conveyors of the first shipping-and-receiving station.

20 Claims, 11 Drawing Sheets

(56) References Cited

U.S. PATENT DOCUMENTS

| | | | |
|---|---|---|---|
| 5,599,154 | A | 2/1997 | Hoelscher et al. |
| 8,146,729 | B1 | 4/2012 | Wagner et al. |
| 2003/0185656 | A1 | 10/2003 | Hansl |
| 2004/0131451 | A1* | 7/2004 | Winkler ............... 414/278 |
| 2006/0245862 | A1 | 11/2006 | Hansl et al. |
| 2011/0008138 | A1 | 1/2011 | Yamashita |
| 2012/0099953 | A1 | 4/2012 | Hortig et al. |
| 2012/0328397 | A1 | 12/2012 | Yamashita |

FOREIGN PATENT DOCUMENTS

| | | | |
|---|---|---|---|
| EP | 2030938 | A1 | 3/2009 |
| EP | 2327643 | B1 | 4/2013 |
| JP | 57199211 | A | 12/1982 |
| JP | 63165205 | | 7/1988 |
| JP | 08175620 | | 7/1996 |
| JP | 08175621 | | 7/1996 |
| JP | 08324721 | | 12/1996 |
| JP | 09240809 | | 9/1997 |
| JP | 10297712 | | 11/1998 |
| JP | 11079321 | | 3/1999 |
| JP | 2004123240 | A * | 4/2004 |
| WO | 03019425 | A1 | 3/2003 |

OTHER PUBLICATIONS

International Preliminary Report on Patentability from corresponding Patent Cooperation Treaty Patent Application No. PCT/JP2008/065892 dated Apr. 22, 2010.

English Translation of the International Preliminary Report on Patentability from corresponding Patent Cooperation Treaty Patent Application No. PCT/JP2008/065892 dated Apr. 22, 2010.

International Search Report and Written Opinion from corresponding Patent Cooperation Treaty Patent Application No. PCT/JP2008/065892 dated Apr. 30, 2009.

* cited by examiner

AUTOMATED THREE DIMENSIONAL WAREHOUSE

CROSS-REFERENCE TO RELATED APPLICATIONS

The present application is a division of U.S. patent application Ser. No. 12/446,541, filed Sep. 3, 2010, which claims priority to a national stage filing under 35 U.S.C. §371 of international application Ser. No. PCT/JP2008/065892 filed in the Japanese Receiving Office on Sep. 3, 2008, the complete disclosure of which is hereby incorporated herein by reference.

BACKGROUND OF THE INVENTION

1. Technical Area

The embodiments disclosed herein relate to a three dimensional automated warehouse that includes at least one pair of layered stacked racks that are oriented parallel to each other and a plurality of transferring shuttles implemented for every layer or every few layers of the stacked racks. The shuttles run in a horizontal direction and transfer packages in and out of the layered stacked racks. The disclosed embodiments also relate to a method of receiving and shipping to and from such a three dimensional automated warehouse.

2. Technical Background

A known example of a three dimensional warehouse is described in Patent Bulletin Heisei 5-21802. The three dimensional warehouse described in the Patent Disclosure is comprised of at least one pair of left and right layered stacks of racks, containing multiple layers. A transferring shuttle, which can run in a horizontal direction, is implemented for each layer of the stacked racks. The transferring shuttle is able to insert or extract the package into or from the left and right layered stacked racks.

The three dimensional automated warehouse described in the Patent Bulletin Heisei 5-21802 contains the receiving station at one end of the layered stacked rack, placed adjacent to the layered stacked rack, and the shipping station at the other end of the layered stacked rack, also placed adjacent to the layered stacked rack. These stations have multiple layers of stand-by conveyors, at the same level as the shelves of the layered stacked racks. Each conveyor can carry only one package at a time. The conveyors on the receiving station move the package towards the layered stacked rack, and the conveyors on the shipping station move the package away from the layered stacked racks. Each transferring shuttle can move up to the stations, and can exchange the package with the stand-by conveyor at the same level as the transferring shuttle.

An elevator device is implemented adjacent to the receiving and shipping stations, on the side away from the layered stacked racks. The elevator device is comprised of a central mast and elevator platforms placed at the left and right side of the central mast, which can move up and down. Each elevator platform also possesses a conveyor function. The elevator platform at the side of the receiving station can be positioned adjacent to receiving conveyors of an external transferring system; it can receive the package transferred from the receiving conveyor; it can move vertically; and it can then transfer the package to the appropriate stand-by conveyor of the receiving station to wait for further handling. Ultimately, the package is stored in the desired location in the layered stacked racks by the transferring shuttle. On the other hand, the elevator platform on the side of the shipping station can be positioned adjacent to a shipping conveyor of the external transfer system. The package, which is transferred to the stand-by conveyor from the layered stacked racks to the stand-by conveyor of the shipping station, can be delivered to the shipping conveyor.

In the three dimensional automated warehouse of the prior art described above, the route from the receiving conveyor of the external transfer system to the receiving station is one-way. The route from the shipping station to the shipping conveyor of the external transfer system is also one-way. This creates the problem of the receiving-shipping sequence becoming a single cycle. That is, in the receiving process, for example, after the package is transferred from the receiving conveyor to the stand-by conveyor of the receiving station via the elevator platform, the elevator platform must move back to the receiving conveyor while being empty. Likewise for the shipping process: the elevator platform must move to the stand-by conveyor of the shipping station, while being empty, to receive the next package. It is desirable to avoid such movement of the elevator platform while being empty.

Also, when the balance of the receiving and shipping quantities is disrupted for an external reason, one of the shipping or receiving devices may be at full capacity or suffer insufficient capacity (over-flow), while the other may be under-utilized. This, combined with the single cycle problem, has become a road block to capacity improvement.

Furthermore, with the construction of the prior art, if one of the devices is out of order, the response will be difficult and expensive. For example, if the elevator platform of the shipping side is out of order, the shipping would stop because the other elevator platform is exclusively for receiving. Even if the conveyor on the elevator platform on the receiving side and the stand-by conveyors are operated in both normal and reverse direction, the addition of a shipping conveyor to the external transfer system will be required, only to address this out-of-order situation.

SUMMARY OF THE INVENTION

Embodiments of the present invention provide new shipping and receiving methods for a three dimensional automated warehouse, addressing the above-stated problems.

According to one embodiment, a three dimensional automated warehouse is comprised of first and second layered stacked racks, which contain multiple layers of shelves and are placed facing each other and parallel to each other. Further, first and second shipping and receiving stations are placed at one end of the first and second layered stacked racks, respectively, adjacent to the layered stacked racks, which have the same number of stand-by conveyors as the number of layers of the layered stacked racks. Transferring shuttles may be implemented for every layer or every few layers of the layered stacked racks along with stand-by conveyors, which can run horizontally between the first and second layered stacked racks and between the first and second shipping and receiving stations and which transfer the packages to and from the racks and stations. First and second elevators may be located adjacent to the first and second shipping and receiving stations respectively, on the side of the stations away from the layered stacked racks, which contain the first and second vertically moving platforms, respectively, which transfer the packages to and from the stand-by conveyors of the shipping and receiving station. A transfer system is also provided which transfers the packages to and from the elevator platform. The direction of motion of the stand-by conveyor of the first shipping and receiving station and that of the stand-by conveyor of the second shipping and receiving station on the same level are opposite to each other, and the direction of motion of some of the stand-by conveyors is opposite to that of the rest of the stand-by conveyors of the first shipping and receiving station.

The direction of motion of the stand-by conveyors of the first shipping and receiving station can be alternated for each layer, or alternated for every few layers.

The (external) transfer system may be comprised of the first receiving conveyor which transfers the package to the first elevator platform; the first shipping conveyor which receives the package from the first elevator platform; the second receiving conveyor which transfers the package to the second elevator platform; and the second shipping conveyor which receives the package from the second elevator platform.

The first and the second elevator platforms mentioned above may be of double-decker type with upper and lower platforms.

The first and the second elevator platforms mentioned above may be constructed so that each of them can carry two or more packages at once.

It is also favorable to be able to switch the direction of the operation of the stand-by conveyors between normal and reverse.

The first shipping conveyor may be placed at the same height level as the first receiving conveyor, and the second shipping conveyor may be placed at the same height level as the second receiving conveyor.

Additional layered stacked racks and shipping and receiving stations can be installed adjacent to the elevator platforms, across from the first layered stacked rack and shipping and receiving stations and the second layered stacked rack and shipping and receiving stations.

According to another embodiment, an automated warehouse may include first and second layered stacked racks, which contain multiple layers of shelves and which are placed facing each other and parallel to each other; first and second shipping and receiving stations placed at one end of the first and second layered stacked racks respectively, adjacent to the layered stacked racks, which have the same number of stand-by conveyors as the number of layers of the layered stacked racks; transferring shuttles implemented for every layer or every few layers of the layered stacked racks and the stand-by conveyors, which can run horizontally between the first and second layered stacked racks and between the first and second shipping and receiving stations and transfer the packages to and from the racks and stations; first and second elevators located adjacent to the first and second shipping and receiving stations respectively, on the side of the stations away from the layered stacked racks, which contain first and second vertically moving platforms respectively, which transfer the packages to and from the stand-by conveyors of the shipping and receiving stations; and a transfer system which transfers the packages to and from the elevator platforms. A shipping and receiving procedure is included such that if a stand-by conveyor of the first shipping and receiving station is designated for receiving, the stand-by conveyor of the second shipping and receiving station at the same level as said stand-by conveyor of the first shipping and receiving station is designated for shipping, and the stand-by conveyor of the first shipping and receiving station at the level above or below is also designated for shipping.

DETAILED DESCRIPTION OF THE EMBODIMENTS

Figure 1:
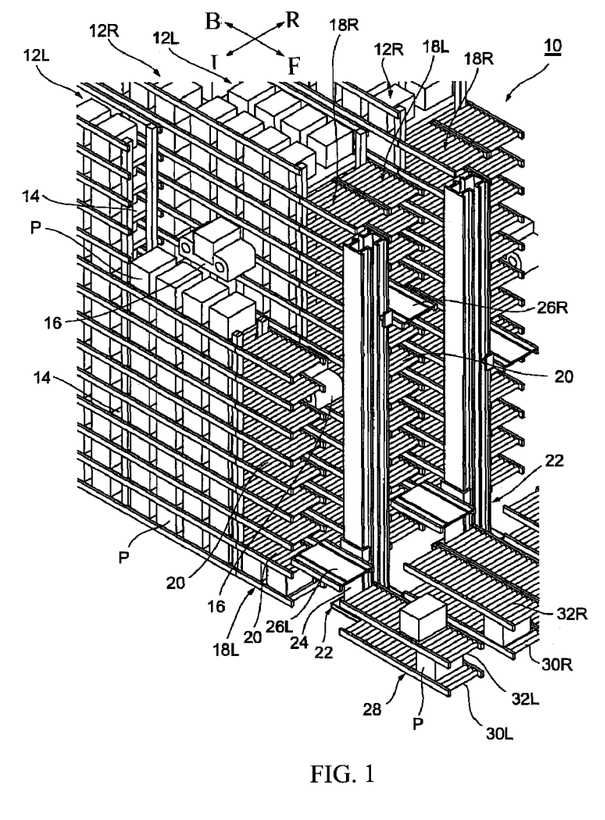
FIG. 1 is a perspective drawing of a first embodiment of the three dimensional automated warehouse.

FIG. 1 is a perspective drawing of a three dimensional automated warehouse 10 according to a first embodiment. As shown in the figure, the three dimensional automated warehouse 10 contains at least one pair of left and right layered stacked racks 12L and 12R. Each of the layered stacked racks 12L and 12R contain multiple layers (5 to 20, to be concrete) of shelves oriented in the same horizontal direction (front and back in FIG. 1). The layered stacked racks 12L and 12R, forming a pair, are oriented parallel to each other and separated by a given distance in between.

A transferring shuttle 16, that is mobile in the horizontal direction along the shelves 14, is implemented between the layered stacked racks 12L and 12R for each layer. The transferring shuttle 16, whose detail is not shown in the drawing, is equipped with a running platform, which can contain a package P on its mid section; a pair of arms installed in the front and back of the running platform, which can extend in the horizontal direction perpendicular to the running direction of the platform (shown as left and right direction in FIG. 1) towards either the left or right side of the platform; and fingers placed at each end of the arms, which can open and close (recede and extend). When the arms are extended towards either the left or right side with the fingers in the closed position, the package P carried on the mid section of the platform can be pushed out, thus the package P can be placed on the shelf 14 at the same height level as the mid section surface of the running platform. Conversely, when the arm is extended into the shelf 14 with the fingers in the open position, then, a finger is put into closed position to hook the package P, and finally the arm is contracted, allowing package P to be retrieved onto the running platform.

Shipping and receiving stations 18L, 18R are located at one end of the layered stacked racks 12L, 12R, adjacent to the layered stacked racks. These shipping and receiving stations 18L, 18R are equipped with the same number of stand-by conveyors 20 as the number of layers of the shelves 14 in the layered stacked racks 12L, 12R. Each of the stand-by conveyors 20 is placed so that its conveying surface is at the same height level as the shelf 14 of the corresponding level, within the layered stacked racks 12L, 12R. The direction of operation of the stand-by conveyor 20 is predetermined to be along the front and back direction in FIG. 1 (see arrows F-B). A number of types and forms can be considered for the stand-by conveyor, but a roller conveyor which allows the package to be loaded on or off in the direction perpendicular to the direction of conveyance is desirable.

Figure 2A:
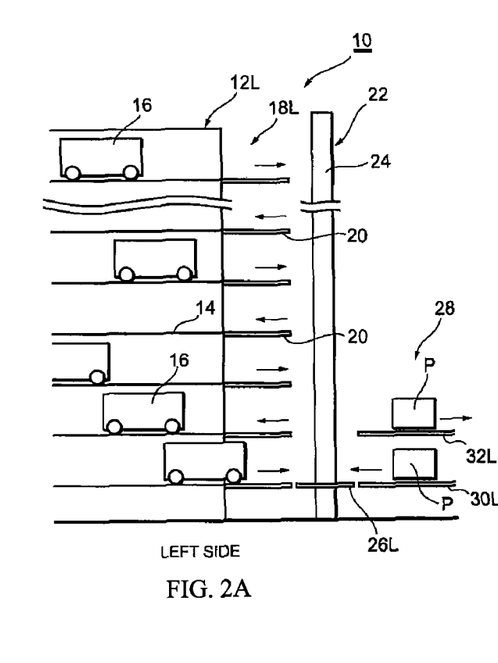
FIG. 2A is a schematic drawing showing a left hand side of the three dimensional automated warehouse of FIG. 1.
Figure 2B:
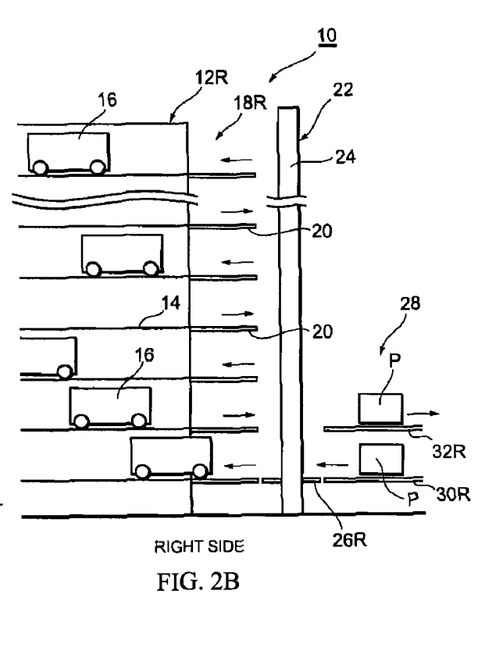
FIG. 2B is a schematic drawing showing a right hand side of the warehouse of FIG. 1.
Figure 3:
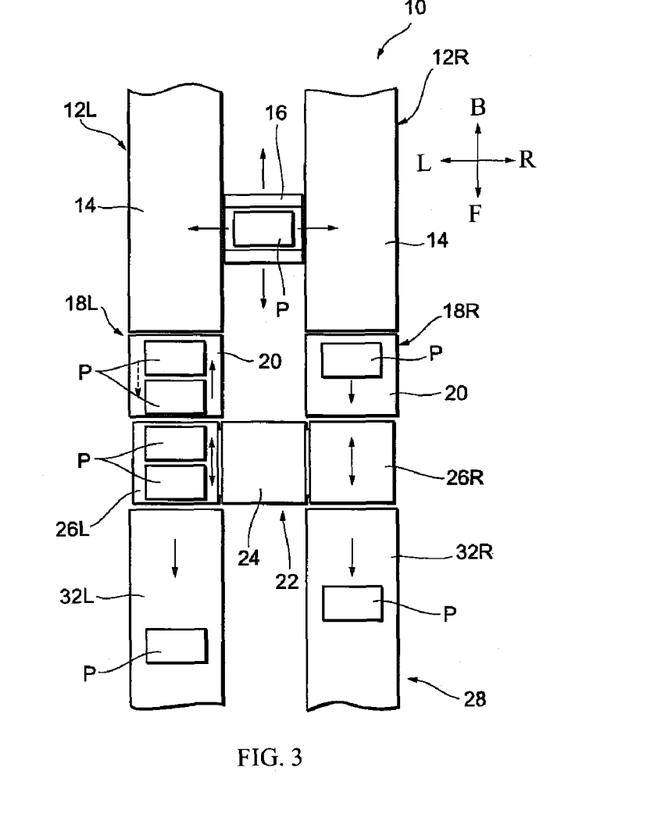
FIG. 3 is schematic horizontal cross-section drawing of the three dimensional automated warehouse shown in FIG. 1.

The direction of conveyance of the stand-by conveyors 20 at each of the shipping and receiving stations 18L, 18R is alternated for each layer. Furthermore, the direction of conveyance of the stand-by conveyor 20 of the left hand side shipping and receiving station 18L and that of the stand-by conveyor 20 of the right hand side shipping and receiving station 18R on the same level are opposite of each other. FIGS. 2 and 3 show this placement and structure schematically. FIG. 2A represents the left hand side including the shipping and receiving station 18L, etc., while FIG. 2B represents the right hand side including the shipping and receiving station 18R, etc.

Further elaboration is provided below, but it is desirable to be able to change the direction of conveyance of each of the stand-by conveyors 20 in order to adapt to variations of shipping and receiving procedures and schemes.

Also, it is desirable for the stand-by conveyor to be able to carry two or more packages P that can be lined up along the direction of conveyance.

There is a space between the left and right shipping and receiving stations 18L and 18R. The transferring shuttle 16 at each level can move into the space between the shipping and receiving stations 18L and 18R, and can exchange the packages with the stand-by conveyor 20 at the same level.

The elevator device 22 is placed adjacent to the shipping and receiving stations 18L, 18R, on the side away from the layered stacked racks 12L, 12R. The elevator device 22 is comprised of a mast 24 placed in the space between the left and right shipping and receiving stations 18L, 18R, and the elevator platforms 26L, 26R located at the left and right sides of the mast 24, which can move up and down.

The elevator platforms 26L, 26R may contain a similar type of conveyor as the stand-by conveyor 20, the direction of conveyance of which can be switched between towards and away from the shipping and receiving stations 18L, 18R. Furthermore, the conveying surface of the elevator platforms 26L, 26R can be aligned to that of the stand-by conveyors 20 at any level between and including the lowest and the highest levels of the shipping and receiving stations 18L, 18R, by raising and lowering of the elevator platforms 26L, 26R. Thus the exchange of the package P between the elevator platforms 26L, 26R and the stand-by conveyors 20 of the shipping and receiving stations 18L, 18R is possible.

It may also be desirable to be able to place two or more packages on the elevator platforms 26L and 26R. Two or more packages P can be placed side by side along the direction of conveyance in the embodiment of FIG. 1.

An external transfer system 28 is connected to the elevator 22 (FIG. 1). The external transfer system 28 is equipped with upper and lower transfer conveyors 30L, 30R; 32L, 32R on each side, so that the packages can be transferred to and from the elevator platforms 26L and 26R. In the first implementation shown in FIGS. 1 and 2, the lower conveyors 30L, 30R on each side are receiving conveyors, and the upper conveyors 32L, 32R are shipping conveyors. By raising and lowering the elevator platforms 26L and 26R on each side, the carrying surface of the elevator platforms 26L and 26R can be at the same level as the receiving conveyors 30L, 30R or the shipping conveyors 32L, 32R.

It is also possible to reverse the roles and designate the lower conveyors 30L, 30R as the shipping conveyors and the upper conveyors 32L, 32R as the receiving conveyors.

It is furthermore possible to designate the conveyor 30L as the shipping conveyor, the conveyor 30R as the receiving conveyor, the conveyor 32L as the receiving conveyor and the conveyor 32R as the shipping conveyor.

All of the operations within the three dimensional automated warehouse 10 described above are controlled by a control device which is not shown in the figures.

The operation of the three dimensional automated warehouse 10 of the construction described above is elaborated in the following.

Suppose multiple packages P are already stored in the layered stacked racks 12L and 12R. The information pertaining to the packages (identification number of each package P and the storage location of each package P, etc.) is stored in the memory of the control device (not shown in figures) which controls all of the operations in the three dimensional automated warehouse 10.

When the command to ship is issued to the control device, the control device determines the appropriate sequence of the packages P to be shipped according to the shipping command, and memorizes it as the shipping data. On the other hand, when the package P for storage arrives through the external transfer route, the information on the package is read by bar-code readers, RFID readers, etc., and the control device memorizes this as the receiving data.

In the construction shown in FIG. 2, suppose the package P to be shipped first is on the fourth shelf 14 of the layered stacked rack 12R. In this case, the control device operates the transferring shuttle 16 at the fourth level and moves it in front of the first package P and retrieves the package P. Next, the transferring shuttle 16 with the first package P loaded on it is moved to the location between the shipping and receiving station 18L, 18R where the package P is transferred to the stand-by conveyor 20 at the fourth level of the receiving and shipping station 18R.

When the elevator platform 26R is level with the stand-by conveyor 20 at the fourth level, the package P already on the stand-by conveyor 20 is transferred to the elevator platform 26R. Then, the elevator platform 26R is lowered to be level with the right shipping conveyor 32R of the external transfer system 28, and the package P on the elevator platform 26R is sent out to the right shipping conveyor 32R. Thus the package P is shipped out.

Next, the control device recognizes the package P to be received first from the receiving data, and guides the package to the right receiving conveyor 30R of the external transfer system 28. Then, the elevator platform 26R is lowered to the level of the receiving conveyor 30R. The package P to be first received is transferred from the receiving conveyor 30R to the elevator platform 26R. The elevator platform 26 is raised to the level where the package P is to be stored so that it is level with the stand-by conveyor 20 of the shipping and receiving station 18R. The package P is then transferred to the stand-by conveyor 20 and remains in the stand-by state waiting for the transfer. After this, the transferring shuttle 16 on the fourth level is moved when appropriate, and the package P is stored at the prescribed location.

After the first shipping and receiving are completed, shipping and receiving operations can be conducted in alternating fashion, i.e. the second package to be shipped, the second package to be received, the third package to be shipped, the third package to be received, etc. can be handled in that order. Thus, the raising and lowering of the elevator platforms 26L, 26R without any cargo will be minimized. The overall operation in the three dimensional automated warehouse 10 becomes of compound cycle, and the efficiency of shipping and receiving is greatly increased. Furthermore, the similar cycle is employed when it is possible to place multiple packages P on the elevator platforms 26L, 26R, but the number of packages processed per cycle is greater than one. For example, when two packages can be placed on each of the elevator platforms 26L, 26R, the compound cycle, which is to be repeated, would be comprised of loading of the first package to be shipped from the stand-by conveyor 20 (at the fourth level), loading of the second package to be shipped from the stand-by conveyor 20 (at the second level), unloading of the first and the second packages to be shipped to the shipping conveyor 32R, moving to the receiving conveyor 30R, loading of the first and second packages to be received, and unloading of the first and the second packages to be received onto the stand-by conveyors 20.

In the above-described situation, the shipping and receiving are well balanced. Even when the balance is off-set, i.e. when there are more shipping than receiving or vice-versa, since the shipping and receiving operations are carried out in alternating fashion at each level and each of the elevator platforms 26L, 26R can be used for either shipping or receiving, the loading of each of the elevator platforms 26L, 26R is balanced. Thus, the operating efficiency of the equipment and devices such as the elevator platforms 26L, 26R is increased, and high capability is realized.

In the embodiment of FIG. 1, two packages P can be held on each of the stand-by conveyors 18L, 18R at the shipping and receiving station. Thus a maximum of 4 packages P can be on the stand-by (as shown in FIG. 3).

Further, in the embodiment of FIG. 1, the directions of conveyance of not only the elevator platforms 26L, 26R but also the stand-by conveyors 20 at the shipping and receiving stations 18L, 18R can be reversed. Thus, when there is no receiving, for example, the stand-by conveyor 20 that is normally used for receiving can be used as the shipping conveyor, as shown with the arrow with the broken line in FIG. 3. Since both of the elevator platforms 26L, 26R can be utilized for shipping, the shipping capability can be increased. Since two packages P can be loaded onto each of the elevator platforms 26L, 26R, the maximum of 4 packages P can be shipped out simultaneously.

Furthermore, even if one of the elevator platforms 26L, 26R, or one of the shipping and receiving stations 18L, 18R loses its function, since the direction of conveyance of the stand-by conveyors 20 can be switched, the shipping and receiving operations can be carried out with just one side being functional. Especially for an automated warehouse, the inability to ship is a graver problem than the inability to receive. Thus, all of the stand-by conveyors on the side that is still functioning can be utilized for shipping in order to continue shipping. Also, depending on how shipping and receiving demands change, the conveyors that are switched for shipping use can be reverted back to receiving use, allowing optimum receiving operations to take place.

Furthermore, the operation of rearranging of the packages P stored in the layered stacked rack 12L, 12R can easily be done. For example, it may be desirable to rearrange the packages at night in the order of shipment to facilitate the work the next day. In such case, the packages P can be rearranged through the elevator device 22, shipping and receiving stations 18L, 18R, and the transferring shuttles 16 without having the packages P come out to the external transfer system 28. For example, consider the case where the package P presently stored on the shelf 14 at the second level of the layered stacked rack 12L, 12R is to be moved to the shelf 14 on the fifth level. Here, the package P can be moved onto the left elevator platform 26L through the stand-by conveyor 20 at the second level of the left shipping and receiving station 18L. Then, the elevator platform 26L is raised to the fifth level where the package P is transferred onto the stand-by conveyor 20 at the fifth level of left shipping and receiving station 18L. The package is then stored in the shelf 14 by the transferring shuttle. In another case, where the package P presently stored in the shelf 14 at the second level of the layered stacked racks 12L, 12R is to be moved to the shelf 14 on the fourth level, the package P can be transferred to the left elevator platform 26L via the stand-by conveyor 20 at the second level of the left shipping and receiving station 18L, then the left elevator platform 26L is raised to the third level so that the package can be transferred onto the stand-by conveyor 20 at the third level of the left shipping and receiving station 18L. The package P is then transferred to the stand-by conveyor 20 at the third level of the right shipping and receiving station 18R by the transferring shuttle 16, then to the fourth level by the right elevator platform 26R and onto the stand-by conveyor 20 on the fourth level of the right shipping and receiving station 18R, and finally to the shelf 14 on the fourth level by the transferring shuttle 16. Of course, by changing the direction of conveyance of the stand-by conveyor 20, the package can be directly transferred from the second to the fourth level. Unlike automated warehouses of the prior art, where the package must come out to the external transfer system in order to be rearranged because the route from receiving to shipping is one-way only, this problem is eliminated in the embodiment of FIG. 1.

In the actual administration of a warehouse, there could be a situation where the package P, which is slated for receiving and storage, may need to be extracted before it is stored. In such case, the package can be directly transferred from the receiving conveyors 30L, 30R to the shipping conveyors 32L, 32R via the elevator platforms 26L, 26R so that such an operation can be executed promptly.

It will be understood that, in the examples of the method of shipping, receiving, etc. described above, the movement of the package P is not restricted to what has been described above.

Figure 4A:
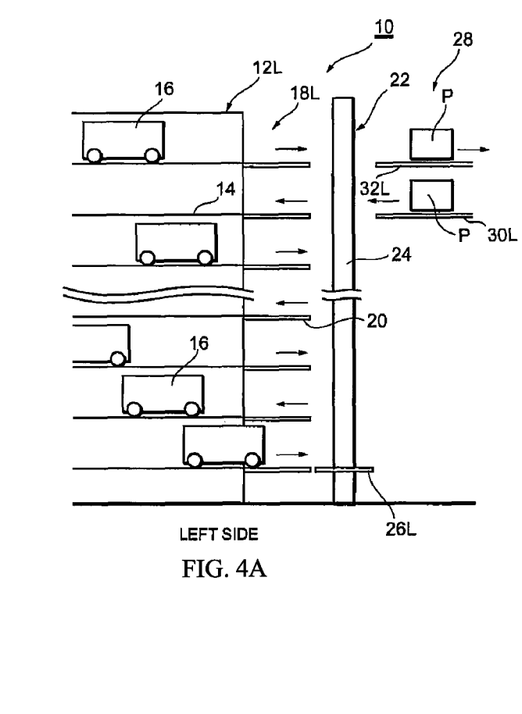
FIG. 4A is a schematic diagram of an alternative embodiment showing a configuration where the receiving conveyor and the shipping conveyor of the external transfer system are located high.
Figure 4B:
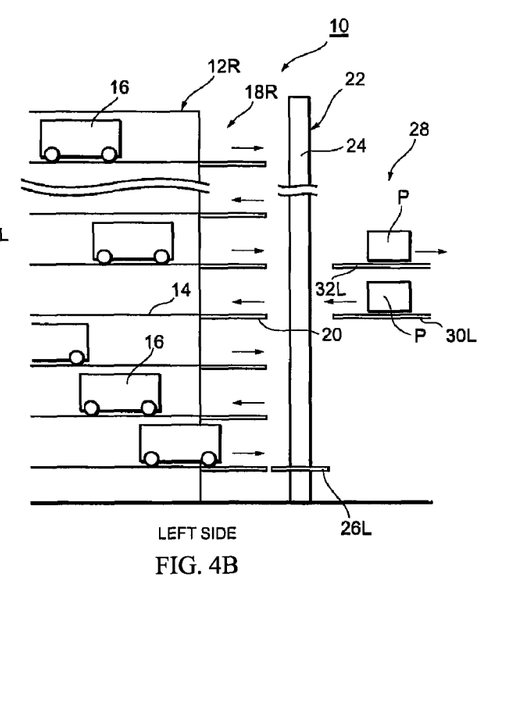
FIG. 4B is a schematic diagram of another alternative embodiment showing a configuration where the receiving conveyor and the shipping conveyor of the external transfer system are located in the middle.

In the embodiments described above, the receiving conveyors 30R, 30L and the shipping conveyors 32R, 32RL of the external transfer system 28 are placed near the floor level of the three dimensional automated warehouse 10 according to the figures, but these could be placed near the top level as shown in FIG. 4A or near the mid level as shown in FIG. 4B.

Figure 5:
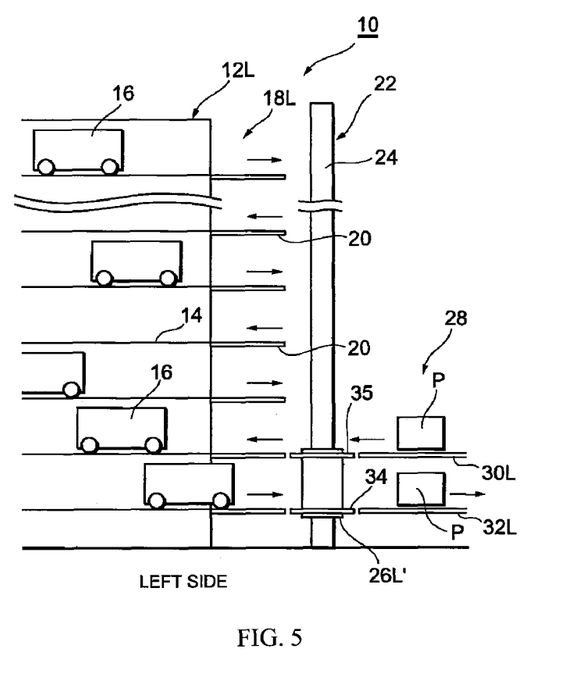
FIG. 5 is a schematic drawing showing an embodiment where the elevator platform is of double-decker type.

Also, a double-decker type of elevator platform 26L' shown in FIG. 5, with two (upper and lower) conveyors 34 and 35 can be used. In this case, by setting the vertical distance between the receiving conveyors 30L, 30R and the shipping conveyors 32L, 32R, the vertical distance between the conveyors 34 and 35 of the elevator platform 26L', and the vertical distance between the stand-by conveyors 18L and 18R equal to each other, the operation of shipping and receiving can be conducted simultaneously, thus the efficiency is increased. In the construction for this purpose, shown in FIG. 5, the vertical position of the receiving conveyor 30L and that of the shipping conveyor 32L are reversed from FIG. 2. That is, the relative vertical position of the shipping and receiving conveyors can be altered to be optimum.

Figure 6:
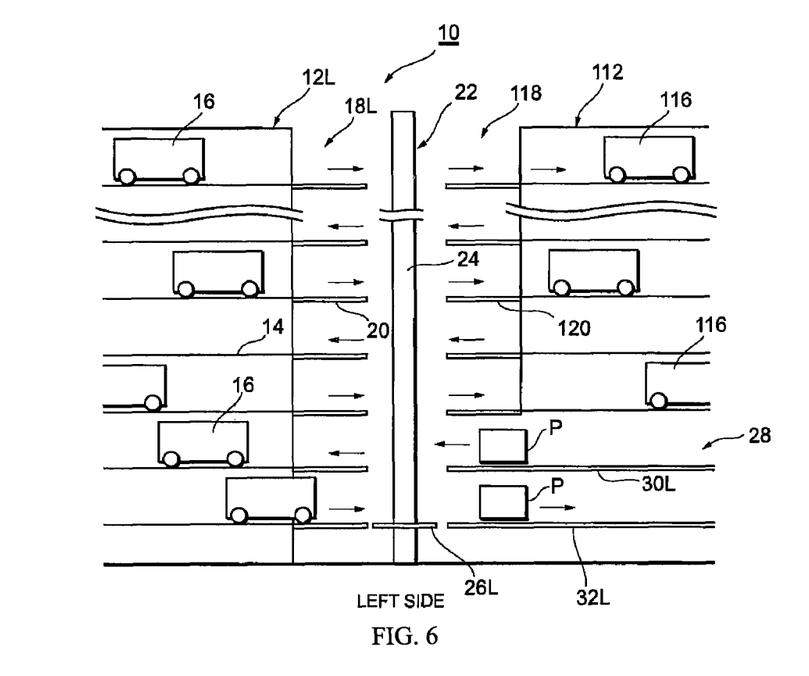
FIG. 6 is a schematic drawing showing an embodiment where additional layered stacked racks and shipping and receiving stations are added.

Furthermore, in addition to the layered stacked racks 12L, 12R, a similar pair of layered stacked racks 112 can be added on the opposite side of the elevator device 22, such as is shown in FIG. 6.

The transferring shuttles 116 are implemented between the pair of additional layered stacked racks 112 at each level, like the embodiment of FIG. 1. Since the receiving conveyors 30L, 30R and the shipping conveyors 32L, 32R are located below these additional layered stacked racks 112, its number of levels may be lower than that of the layered stacked racks 12L, 12R on the opposite side.

The shipping and receiving station 118, similar to the shipping and receiving stations 18L, 18R of the embodiment of FIG. 1, is placed adjacent to each of the additional layered stacked racks 112. The shipping and receiving station 118 is situated to face the elevator device 22. The stand-by conveyors 20, 120 at the same height level of the shipping and receiving stations 18L, 18R, 118, which are facing each other across the elevator device 22, may have the same direction of conveyance.

In the construction shown in FIG. 6, not only the storage quantity and capacity for the package P is higher, but also the rearrangement of the package within the same level can be more easily achieved. Furthermore, for the same floor space, the running coverage area of transferring shuttles 16, 116 for the construction shown in FIG. 6 will be smaller than the first embodiment (FIG. 1), which decreases the motion of the transferring shuttle 16, 116 and increases the processing speed of the transferring shuttle 16, 116.

Also, for example, the packages at the shipping and receiving station 118 on the side of the layered stacked racks 112 can be transferred onto the elevator platforms 26L, 26R, at the same time that the packages that are already on the elevator platforms 26L, 26R are being transferred to the shipping and receiving stations 18L, 18R, and vice-versa. Thus, shipping and receiving can be done in a single stroke, further raising the capability.

As a variant of the construction shown in FIG. 6, the receiving conveyors 30L, 30R and the shipping conveyors 32L, 32R can be placed at the mid level or at the top level. Also, the double-decker type of elevator platform, shown in FIG. 5, can be used in the construction of FIG. 6.

In the above implementation form, the receiving conveyors 30L, 30R and the shipping conveyors 32L, 32R are laid out on left and right sides, but depending on the shipping and receiving quantity, these can be replaced with one single conveyor whose direction of conveyance can be switched.

The transferring shuttle 16 is implemented for each level of the layered stacked racks 12L, 12R in the above-described implementation. If the transferring shuttle is of the type that can also move in the vertical direction, one transferring shuttle can be implemented for multiple levels.

The directions of conveyance of the stand-by conveyors 20 at the shipping and receiving stations 18L, 18R on each side do not have to be alternated for each layer. It would suffice, for example, if the direction of conveyance of some of the stand-by conveyors 20 of the left shipping and receiving station 18L is opposite from the rest of the stand-by conveyors 20. The direction can be altered every few levels, for example, every other layer, or every three layers. (See, for example, FIG. 7)

Figure 8:
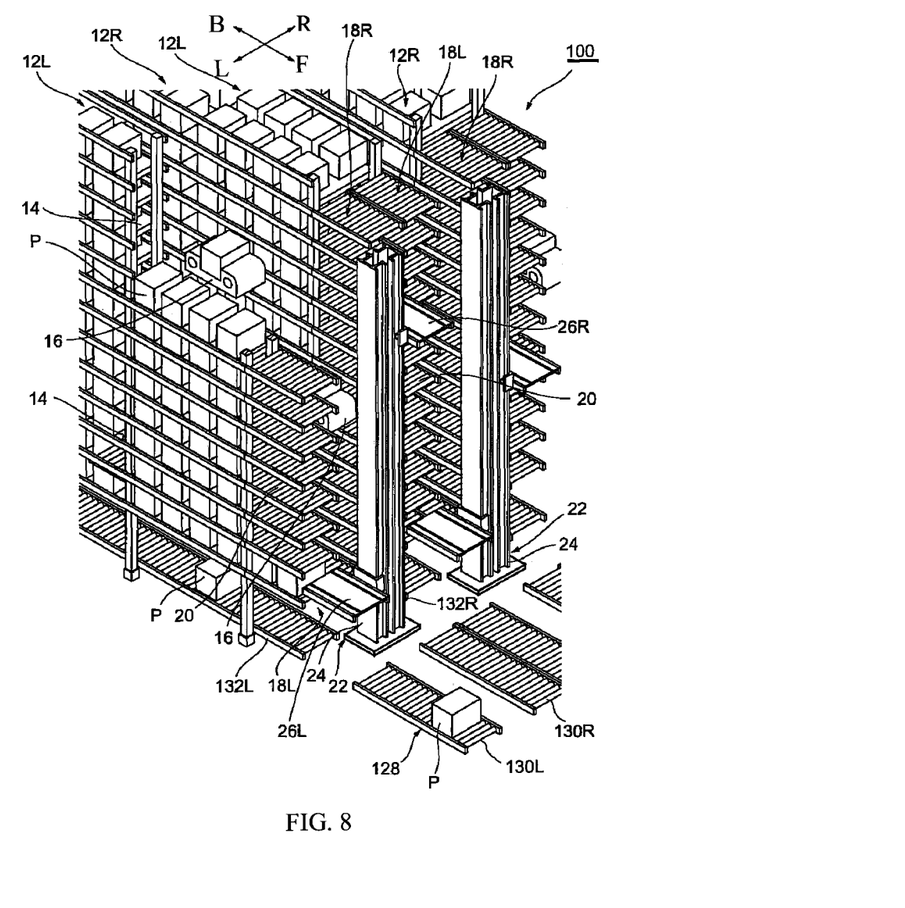
FIG. 8 is a perspective drawing showing another alternative embodiment of a three dimensional automated warehouse.

FIG. 8 is a perspective drawing of a three dimensional automated warehouse 100 according to yet another embodiment. This three dimensional automated warehouse 100 is fundamentally similar to the three dimensional automated warehouse 10 of the first implementation. The same numbers and markings are assigned to the equivalent parts, and redundant explanation will not be presented.

Figure 9A:
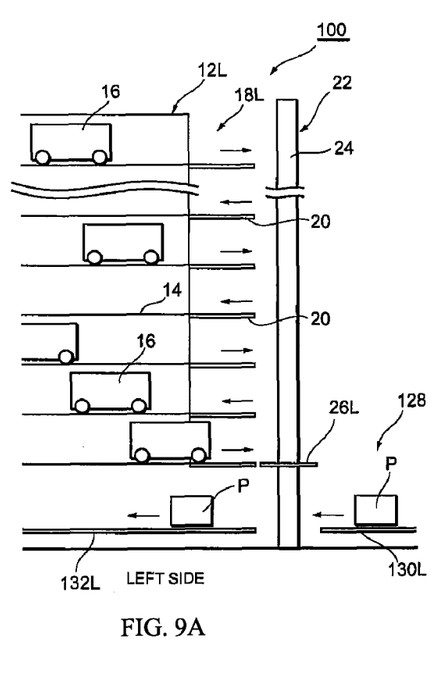
FIG. 9A is a schematic drawing showing the left hand side of the three dimensional automated warehouse of FIG. 8.
Figure 9B:
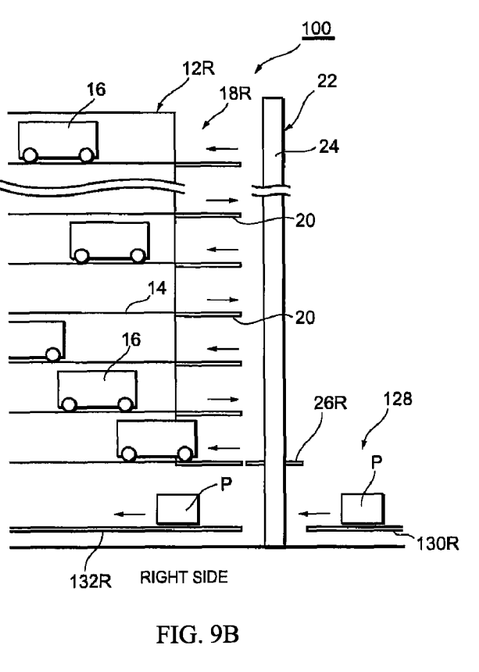
FIG. 9B is a schematic drawing showing the right hand side of the warehouse of FIG. 8.

As seen in FIG. 9, which is the schematic drawing derived from FIG. 8, the difference between the three dimensional automated warehouses 10 and 100, respectively, is that the receiving conveyors 130L, 130R and the shipping conveyors 132L, 132R are placed on a straight line across the elevator device 22, for each side of the external transfer system 128. In the construction shown in FIGS. 8 and 9, the shipping conveyors 132L, 132R are placed under the layered stacked racks 12L, 12R. Thus, when the elevator platforms 26L, 26R on each side are lowered to the lowest level, the conveying surfaces of the receiving conveyors 130L, 130R, of the elevator platforms 26L, 26R and of the shipping conveyors 132L, 132R are aligned to form a single surface.

In such a construction, the method of operations such as shipping, receiving and rearranging or relocation of package P is essentially the same as that described above with respect to warehouse 10. Consider, for example, the case where the package P, that is to be shipped, is on the elevator platform 26L, 26R which is at the same level as the receiving conveyor 130L, 130R and the shipping conveyor 132L, 132R. The package P on the elevator platform 26L, 26R can be transferred onto the shipping conveyor 132L, 132R at the same time the package P, that is to be received and is being transferred on the receiving conveyor 130L, 130R, is loaded onto the elevator platform 26L, 26R. In the embodiment of FIG. 1, the elevator platform 26L, 26R, which is empty after unloading the package P, had to be brought to the level of receiving conveyor 30L, 30R. The embodiment of FIG. 8 has the advantage of eliminating such wasted motion.

Figure 10A:
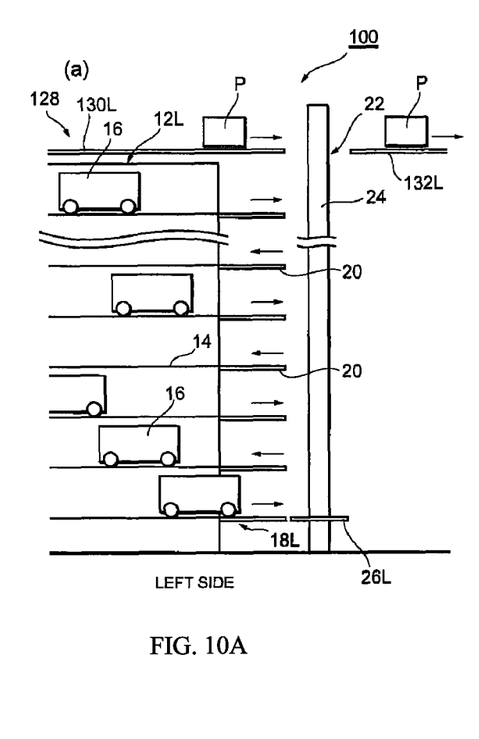
FIG. 10A is a schematic drawing of an alternative embodiment of the warehouse of FIG. 8 in which the receiving conveyor and the shipping conveyor of the external transfer system are located high.
Figure 10B:
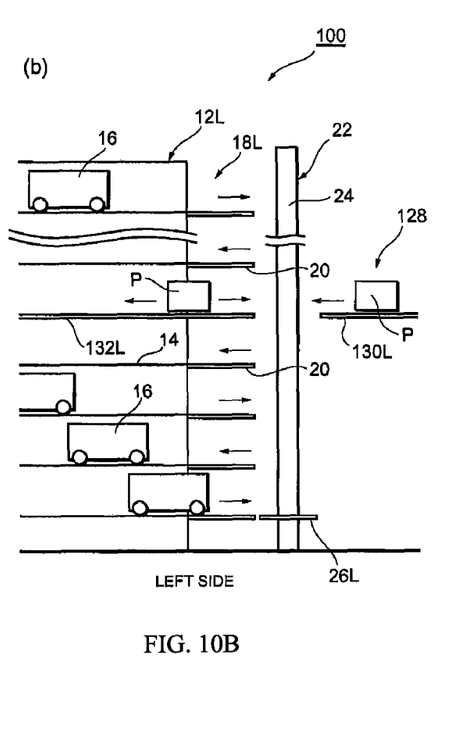
FIG. 10B is a schematic drawing of another alternative embodiment of the warehouse of FIG. 8 in which the receiving conveyor and the shipping conveyor of the external transfer system are located in the middle.

A variation of the embodiment of FIG. 8 is shown in FIG. 10A, in which the receiving conveyors 130L, 130R and the shipping conveyors 132L, 132R are located above the layered stacked racks 12L, 12R. In another embodiment, shown in FIG. 10B, the receiving conveyors 130L, 130R and the shipping conveyors 132L, 132R can be placed at the mid level.

Figure 7:
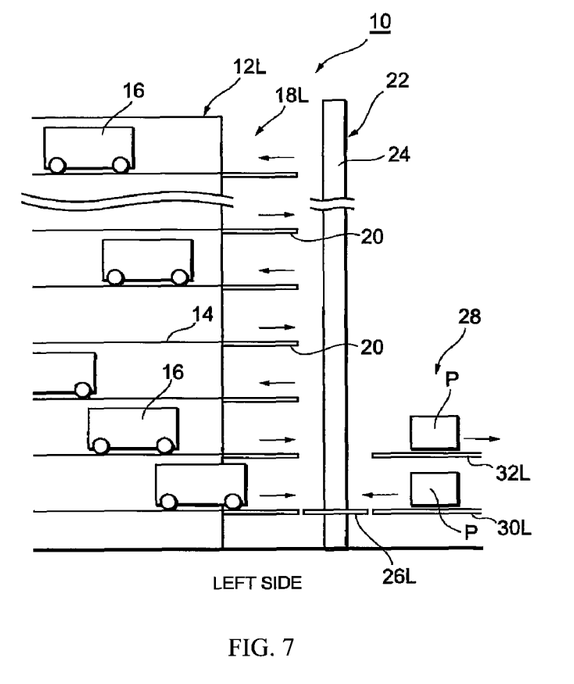
FIG. 7 is a schematic drawing showing an embodiment where the stand-by conveyors of the shipping and receiving stations have their operating directions reversed every few layers.
Figure 11:
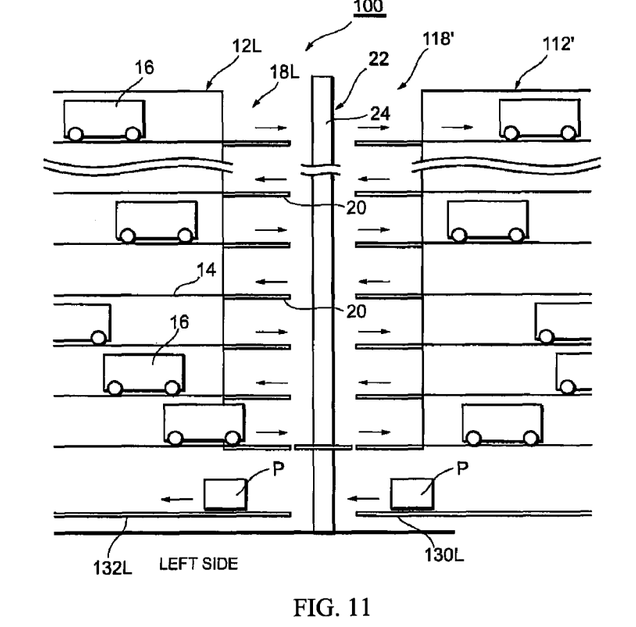
FIG. 11 is a schematic drawing of an embodiment where additional layered stacked racks and shipping and receiving stations are added to the configuration shown in FIG. 9.

In still another embodiment, such as is shown in FIG. 11, a pair of additional layered stacked racks 112' and additional shipping and receiving stations 118' can be placed across from the layered stacked racks 12L, 12R and the shipping and receiving stations 18L, 18R. Also, if the transferring shuttle 16 is of the type that can also move vertically, one transfer shuttle can be assigned for multiple levels. Furthermore, the direction of conveyance of the stand-by conveyor of the shipping and receiving station does not have to alternate at each level. It could alternate every few levels, for example, every other level or every three levels, as shown in FIG. 7.

Also, although the shipping and receiving stations 18L, 18R, the elevator device 22, and the external transfer system 28, etc have been described as if they are only on one side of the layered stacked racks 12L, 12R, it will be understood that the shipping and receiving station, elevator device, external system, etc., could also be located on the other side as well.

It will also be understood that the invention is not limited to what is described above, and that numerous variations and alterations are possible within the spirit and scope of this invention, as set forth in the following claims.

The embodiments of the invention in which an exclusive property or privilege is claimed are defined as follows:

1. A storage and retrieval method performed in a three-dimensional automated warehouse having first and second stacked racks that are oriented parallel to each other, each includes a plurality of levels of shelves, first and second shipping-and-receiving stations placed next to each other at a same end of the first and the second stacked racks, each of said stations having a plurality of stand-by conveyors, one of said stand-by conveyors of each of said shipping-and-receiving stations being at a particular level of shelves, said automated warehouse including a plurality of transfer shuttles that each operate in a horizontal direction at one of said levels to transfer packages between said shelves of said first and second stacked racks and said stand-by conveyors of said first and second shipping-and-receiving stations, said automated warehouse further including an elevator located next to the first and the second shipping-and-receiving stations, said elevator including a first elevator platform that transfers packages to and from said stand-by conveyors of said first shipping-and-receiving station and a second elevator platform that transfers packages to and from said stand-by conveyors of said second shipping-and-receiving station, and an external transfer system adapted to transfer packages to and from said first and second elevator platforms, said method comprising:

propelling each said first and second elevator platform between said external transfer system and the respective said first and second shipping-and-receiving stations in a cycle to selectively dispatch packages from said stand-by conveyors to said external transfer system and store packages from said external transfer system to said stand-by conveyors;

operating a first stand-by conveyor on a first level of the first shipping-and-receiving station to dispatch at least one first package from said first stand-by conveyor to said first elevator platform during a particular cycle of said first elevator platform and operating a second stand-by conveyor of the second shipping-and-receiving station on the same said first level of said stacked racks to store at least one second package from said second elevator platform during a particular cycle of said second platform that is the same as the particular cycle of said first elevator platform, wherein storage and retrieval of packages on said first level of said stacked racks are balanced; and operating a third stand-by conveyor of the first shipping-and-receiving station on a second level of said stacked racks that is different from said first level to store at least one third package from said first elevator platform during the particular cycle of said first elevator platform.

2. The method as claimed in claim 1 wherein said stand-by conveyors are operated in a first conveying direction in order to dispatch packages and in a second conveying direction that is opposite to said first conveying direction in order to store packages.

3. The method of claim 1 including driving the conveying directions of the stand-by conveyors of the first shipping-and-receiving station in conveying directions that alternate with the conveying directions of said stand-by conveyors of the first shipping-and-receiving station at adjacent levels of shelves during the particular cycle of said first elevator platform.

4. The method of claim 1 including driving the conveying directions of said stand-by conveyors of the first shipping-and-receiving station in conveying directions that alternate with the conveying directions of said stand-by-conveyors of the first shipping-and-receiving station every few levels of shelves during the particular cycle of said first elevator platform.

5. The method of claim 1 wherein said transfer system:
transfers packages to said first elevator platform with a first receiving conveyor;
transfers packages from said first elevator platform with a first shipping conveyor located above or below said first receiving conveyor;
transfers packages to said second elevator platform with a second receiving conveyor; and
transfers packages from said second elevator platform with a second shipping conveyor located above or below said second receiving conveyor.

6. The method of claim 1 wherein said first and second elevator platforms are each double-decker platforms.

7. The method of claim 1 including at least occasionally carrying two or more packages with each of said first and second elevator platforms.

8. The method of claim 1 including selectively alternating which of the stand-by conveyors is driving in the first conveying direction and which of the stand-by conveyors on the same first level of the stacked racks is driving in the second conveying direction to change the configuration of the warehouse.

9. The method of claim 1 wherein said transfer system:
transfers packages to said first elevator platform with a first receiving conveyor;
transfers packages from said first elevator platform with a first shipping conveyor located at a same height as the first receiving conveyor;
transfers packages to said second elevator platform with a second receiving conveyor; and
transfers packages from said second elevator platform with a second shipping conveyor located at a same height as the second receiving conveyor.

10. The method of claim 1 including operating a fourth stand-by conveyor of the second shipping-and-receiving stations on the second level of said stacked racks to retrieve at least one package from the fourth stand-by conveyor to said second elevator platform during the particular cycle of said second elevator platform.

11. A storage and retrieval method performed in a three-dimensional automated warehouse having first and second stacked racks that are oriented parallel to each other, each includes a plurality of levels of shelves, first and second shipping-and-receiving stations placed next to each other at a same end of the first and the second stacked racks, each of said stations having a plurality of stand-by conveyors, one of said stand-by conveyors of each of said shipping-and-receiving stations being at a particular level of shelves, said automated warehouse including a plurality of transfer shuttles that each operate in a horizontal direction at one of said levels to transfer packages between said shelves of said first and second stacked racks and said stand-by conveyors of said first and second shipping-and-receiving stations, said automated warehouse further including an elevator located next to the first and the second shipping-and-receiving stations, said elevator including a first elevator platform that transfers packages to and from said stand-by conveyors of said first shipping-and-receiving station and a second elevator platform that transfers packages to and from stand-by conveyors of said second shipping-and-receiving stations, and an external transfer system adapted to transfer packages to and from said first and second elevator platforms, said method comprising:

propelling each said first and second elevator platform between said external transfer system and the respective said first and second shipping-and-receiving stations in a cycle to selectively dispatch package from said stand-by conveyors to said external transfer system and store packages from said external transfer system to said stand-by conveyors;

operating a first stand-by conveyor on a first level of the first shipping-and-receiving station to store at least one first package from said first shipping-and-receiving station to said first elevator platform during a particular cycle of said first elevator platform and operating a second stand-by conveyor of the second shipping-and-receiving station on the same said first level of the stacked racks as said first stand-by conveyor to dispatch at least one second package to said second elevator platform during a particular cycle of said second platform that is the same as the particular cycle as said first elevator platform, wherein storage and retrieval of packages on said first level of said stacked racks are balanced; and operating a third stand-by conveyor of the first shipping-and-receiving station on a second level of said stacked racks that is different from said first level to dispatch at least one third package to said first elevator platform during the particular cycle of said first elevator platform.

12. The method of claim 11 wherein said stand-by conveyors are operated in a first conveying direction in order to dispatch packages and in a second conveying direction that is opposite to said first conveying direction in order to store packages.

13. The method of claim 11 including driving the conveying directions of the stand-by conveyors of the first shipping-and-receiving station in conveying directions that alternate with the conveying directions of said stand-by conveyors of the first shipping-and-receiving station at adjacent levels of shelves during the particular cycle of said first elevator platform.

14. The method of claim 11 including driving the conveying directions of said stand-by conveyors of the first shipping-and-receiving station in conveying directions that alternate with the conveying directions of said stand-by-conveyors of the first shipping-and-receiving station every few levels of shelves during the particular cycle of said first elevator platform.

15. The method of claim 11 wherein said external transfer system:
   transfers packages to said first elevator platform with a first receiving conveyor;
   transfers packages from said first elevator platform with a first shipping conveyor located above or below said first receiving conveyor;
   transfers packages to said second elevator platform with a second receiving conveyor; and
   transfers packages from said second elevator platform with a second shipping conveyor located above or below said second receiving conveyor.

16. The method of claim 11 wherein each of said first and second elevator platforms is a double-decker platform.

17. The method of claim 11 including at least occasionally carrying two or more packages with each of said first and second elevator platforms.

18. The method of claim 11 including selectively alternating which of the stand-by conveyors is driving in the first conveying direction and which of the stand-by conveyors on the same first level of the stacked racks is driving in the second conveying direction to change the configuration of the warehouse.

19. The method of claim 11 wherein said external transfer system:
   transfers packages to said first elevator platform with a first receiving conveyor;
   transfers packages from said first elevator platform with a first shipping conveyor located at a same height as the first receiving conveyor;
   transfers packages to said second elevator platform with a second receiving conveyor; and
   transfers packages from said second elevator platform with a second shipping conveyor located at a same height as the second receiving conveyor.

20. The method of claim 11 including operating a fourth stand-by conveyor of the second shipping-and-receiving stations on the second level of said stacked racks to store at least one package from the second elevator platform during the particular cycle of said second elevator platform.

* * * * *